United States Patent
Sonoda et al.

(10) Patent No.: US 10,365,666 B2
(45) Date of Patent: Jul. 30, 2019

(54) MASS FLOW CONTROLLER

(71) Applicant: HITACHI METALS, LTD., Minato-ku, Tokyo (JP)

(72) Inventors: Masashi Sonoda, Kumagaya (JP); Yuji Kishine, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 18 days.

(21) Appl. No.: 15/758,675

(22) PCT Filed: Sep. 9, 2016

(86) PCT No.: PCT/JP2016/076681
§ 371 (c)(1),
(2) Date: Mar. 8, 2018

(87) PCT Pub. No.: WO2017/043648
PCT Pub. Date: Mar. 16, 2017

(65) Prior Publication Data
US 2018/0275689 A1    Sep. 27, 2018

(30) Foreign Application Priority Data
Sep. 11, 2015 (JP) .................. 2015-179223

(51) Int. Cl.
*G05D 7/06* (2006.01)
*G01F 1/00* (2006.01)
(Continued)

(52) U.S. Cl.
CPC ......... *G05D 7/0623* (2013.01); *G01F 1/00* (2013.01); *G01F 1/6847* (2013.01);
(Continued)

(58) Field of Classification Search
CPC .................................. G01F 1/00; G01F 1/68
See application file for complete search history.

(56) References Cited

U.S. PATENT DOCUMENTS

| | | | |
|---|---|---|---|
| 9,760,096 B2 * | 9/2017 | Ellec | G05D 7/0635 |
| 2017/0293309 A1 * | 10/2017 | Kishine | G05D 7/0635 |

FOREIGN PATENT DOCUMENTS

| | | |
|---|---|---|
| JP | 08-0554268 A | 2/1996 |
| JP | 2004093174 A | 3/2004 |
| JP | 2009087126 A | 4/2009 |

OTHER PUBLICATIONS

WIPO, International Search Report for International Patent Application No. PCT/JP2016/076681, dated Oct. 11, 2016 (3 pages).

* cited by examiner

*Primary Examiner* — Jewel V Dowtin
(74) *Attorney, Agent, or Firm* — Neugeboren O'Dowd PC

(57) ABSTRACT

A control means configured to perform flow rate control in which the control means outputs a control signal to a flow control valve to control a valve opening such that a measured flow rate of gas measured by a flow meter matches a set flow rate adjusts intensity of the control signal such that an absolute value of a change amount of the valve opening becomes larger as measured temperature of the gas measured by a thermometer becomes further higher than reference temperature, while the absolute value of the change amount of the valve opening becomes smaller as the measured temperature becomes further lower than the reference temperature. Thereby, change of response time on changing the valve opening of the flow control valve due to the difference between the measured temperature of the gas and the reference temperature can be reduced.

9 Claims, 3 Drawing Sheets

(51) Int. Cl.
  *G01F 1/68* (2006.01)
  *G01F 15/02* (2006.01)
  *G01F 1/684* (2006.01)
  *G01F 1/84* (2006.01)
  *G01F 15/04* (2006.01)
  *G01F 15/00* (2006.01)
(52) U.S. Cl.
  CPC ............ *G01F 1/8431* (2013.01); *G01F 15/02* (2013.01); *G01F 15/04* (2013.01); *G05D 7/06* (2013.01); *G01F 15/002* (2013.01); *G01F 15/005* (2013.01)

MASS FLOW CONTROLLER

CLAIM OF PRIORITY UNDER 35 USC § 371

The present Application for Patent is a National Phase of International Patent Application No. PCT/JP2016/076681, filed Sep. 9, 2016, which claims priority to JP Patent Application No. 2015-179223, filed Sep. 11, 2015, both of which are assigned to the assignee hereof and hereby expressly incorporated by reference herein.

TECHNICAL FIELD

The present invention relates to a mass flow controller which can be suitably used for semiconductor manufacturing equipment, etc.

BACKGROUND

A mass flow controller is widely used for the purpose of controlling a flow rate of gas supplied to semiconductor manufacturing equipment, or starting or stopping supply of gas etc., for example. The mass flow controller comprises a flow control valve, a flow meter and a control means.

A valve opening of the flow control valve is changed (increased and decreased) according to a control signal which the control means outputs. Here, the "valve opening" means a value corresponding to a cross-sectional area of the narrowest part of a path through which gas passes inside the flow control valve. The valve opening of the flow control valve is controlled so as to become an arbitrary value between the minimum value (for example, zero) corresponding to the minimum value of the above-mentioned cross-sectional area and the maximum value corresponding to the maximum value of the above-mentioned cross-sectional area. When the valve opening is the minimum value (for example, zero), gas does not flow. When the valve opening is maximum, a flow rate of gas, which the mass flow controller supplies, becomes maximum.

The flow meter measures a flow rate of gas which passes through the flow control valve. Generally a calibrating (calibration) of the flow meter is performed using reference gas (for example, nitrogen gas) at a certain reference temperature (for example, 22° C.). When controlling a flow rate of gas of a different kind from the reference gas, an error occurs in the flow rate of the gas measured by the flow meter since physical properties (for example, specific heat, etc.) of the gas are different from physical properties of the reference gas. In this case, the error can be corrected using the conversion factor (CF) acquired beforehand for each kind of gas (see for example, Japanese Patent Application Laid-Open (kokai) No. H08-54268). Moreover, when temperature of the gas is different from that of the reference temperature, the flow rate of the gas measured by the flow meter can be corrected based on the temperature of the gas (see for example, Japanese Patent Application Laid-Open (kokai) No. 2004-93174).

The control means outputs a control signal to the flow control valve to control the valve opening such that a flow rate of gas measured by the flow meter matches a set flow rate. In case of what is called a normally closed type flow control valve, the valve opening becomes minimum (zero) and the flow rate of the gas also becomes zero when intensity of the control signal (voltage intensity or electric-current intensity) is minimum (zero), while the valve opening is maximum and the flow rate of the gas also becomes maximum when the intensity of the control signal is maximum.

On the other hand, in case of what is called a normally open type flow control valve, the valve opening is maximum and the flow rate of the gas also becomes maximum when the intensity of the control signal (voltage intensity or electric-current intensity) is minimum, while the valve opening becomes minimum (for example, zero) and the flow rate of the gas also becomes minimum (for example, zero) when intensity of the control signal is maximum. Thus, the valve opening of the flow control valve is changed depending on the intensity of the control signal, and the flow rate of gas passing through the flow control valve also changes. The control means can perform feedback control, in which the flow rate of gas measured by the flow meter is used as a controlled variable, as a method for controlling the flow rate of gas.

When a valve opening of a normally closed type flow control valve is changed by using a piezoelectric element, for example, the valve opening is proportional to voltage intensity impressed to the piezoelectric element. For example, in a case where the voltage intensity impressed to the piezoelectric element is a maximum value (50 V) and the flow rate of gas at that time is 1 slm (standard litter per minute) when the valve opening is maximum, the valve opening will become 50% of the maximum value and the flow rate of the gas will become 0.5 slm when the voltage intensity impressed to the piezoelectric element is set to 25 V (50% of the maximum value). On the other hand, when a valve opening of a normally open type flow control valve is changed by using a piezoelectric element, the valve opening becomes maximum when the voltage intensity impressed to the piezoelectric element is zero, and the valve opening becomes smaller as the voltage intensity impressed to the piezoelectric element increases. For example, in a case where the minimum voltage intensity impressed to the piezoelectric element for making the valve opening to zero is 50 V, the valve opening will become 50% of the maximum value and the flow rate of the gas will become 0.5 slm when the voltage intensity impressed to the piezoelectric element is set to 25 V. In addition, the correspondence relation between the voltage intensity impressed to the piezoelectric element (intensity of the control signal) and the valve opening, which was shown in the above-mentioned explanation, is only an example, and the scope of the present invention is not limited by those specific numerical values.

SUMMARY

A mass flow controller according to and aspect comprises a flow control valve configured such that a valve opening of the flow control valve can be changed, a flow meter configured to measure a flow rate of gas passing through the flow control valve, and a control means configured to output a control signal to said flow control valve to control said valve opening. The control means is configured to perform flow rate control in which the control means outputs the control signal to the flow control valve to control the valve opening such that a measured flow rate which is a mass flow rate of the gas measured by the flow meter matches a set flow rate as a target value of a mass flow rate of the gas.

Furthermore, the mass flow controller includes a thermometer configured to measure temperature of the gas. In addition, the control means is configured to perform signal correction processing in the above-mentioned flow rate control. In the signal correction processing, when the measured temperature is higher than the reference temperature, the control means adjusts the control signal such that an absolute value of a change amount of the valve opening in the above-mentioned flow rate control becomes larger as an absolute value of temperature difference which is a difference acquired by subtracting a predetermined reference temperature from measured temperature which is temperature of the gas measured by the thermometer becomes larger. On the other hand, when the measured temperature is lower than the reference temperature, the control means adjusts the control signal such that the absolute value of the change amount of the valve opening in the above-mentioned flow rate control becomes smaller as the absolute value of the temperature difference becomes larger. The control signal adjusted in this way may be referred to as a "corrected control signal" hereafter.

Because the adjusted control signal (corrected control signal) is output to the flow control valve, the valve opening of the flow control valve is adjusted such that a deviation of the flow rate of the gas due to the difference between the measured temperature and the reference temperature is eliminated. As a result, since the gas flows in a state where the valve opening of the flow control valve is more suitably controlled immediately after a startup of the flow rate control, a problem that response time changes depending on the temperature of the gas is reduced.

According to another aspect, the flow control valve is configured such that the valve opening becomes larger as intensity of the control signal becomes larger. In this case, the control means is configured to set, as a value of the intensity of the corrected control signal, a value acquired by adding a value acquired by multiplying a value of the temperature difference by a temperature correction coefficient, to a value of intensity of an unadjusted control signal, in the above-mentioned signal correction processing. Alternatively, the flow control valve is configured such that the valve opening becomes larger as intensity of the control signal becomes smaller. In this case, the control means is configured to set, as a value of the intensity of the corrected control signal, a value acquired by subtracting a value acquired by multiplying a value of the temperature difference by a temperature correction coefficient, from a value of intensity of an unadjusted control signal, in the above-mentioned signal correction processing. In accordance with such configurations, the intensity of the control signal can be adjusted (signal correction processing can be performed) through an easy procedure.

In another embodiment, the control means is configured to perform the flow rate control by what is called feedback control. Specifically, the control means is configured to bring a flow rate difference which is a difference acquired by subtracting the measured flow rate from the set flow rate close to zero by changing intensity of the control signal when the absolute value of the flow rate difference is a predetermined threshold or more.

Furthermore, in the above-mentioned embodiment, the intensity of the control signal in the above-mentioned flow rate control may be configured as a sum of an initial value determined based on the set flow rate and the measured temperature and a compensation value determined based on the flow rate difference. In this case, the control means may be configured to perform the signal correction processing only on the initial value and not to perform the signal correction processing on the compensation value.

DETAILED DESCRIPTION

Technical Problem

Figure 1:
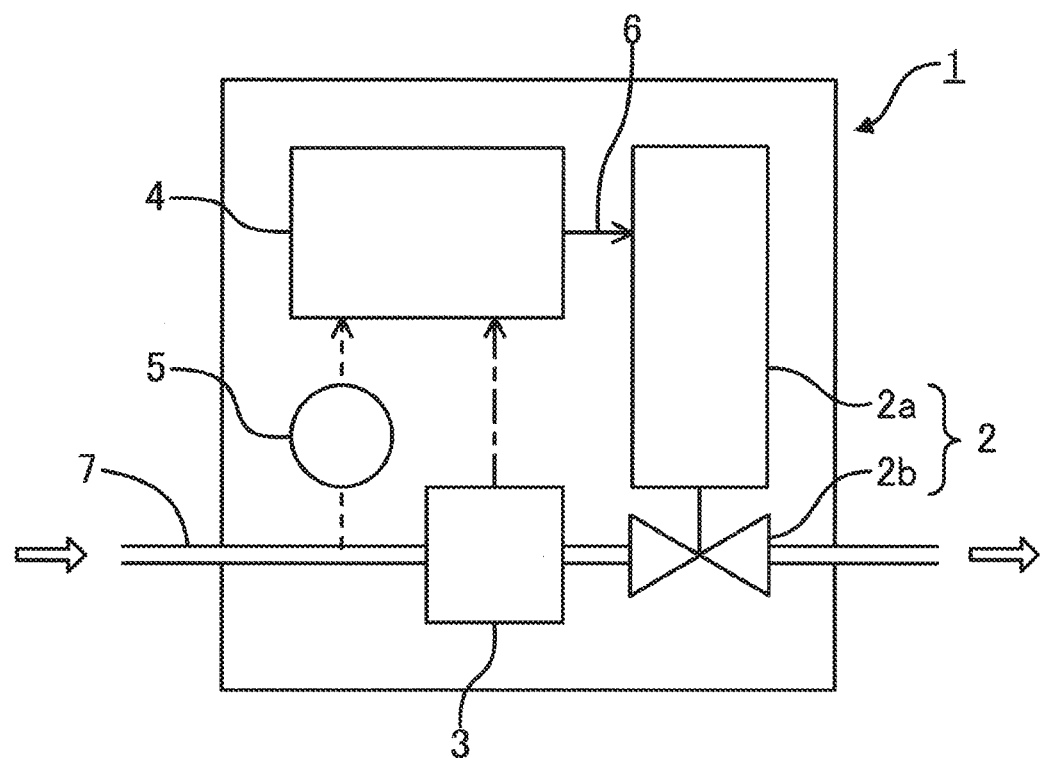
FIG. 1 is a conceptual diagram for showing an example of a configuration of a mass flow controller according to the present invention.

As mentioned above, in accordance with conventional technologies, as for a flow meter, it is possible to acquire an accurate flow rate of gas by correcting a flow rate of the gas measured by the flow meter based on temperature of the gas, even in a case where the temperature of the gas passing through the mass flow controller is different from reference temperature at which the flow meter was calibrated. However, as for a valve opening of a flow control valve, temperature change of gas is not considered particularly. As a result, even in a case where a valve opening is constant, a mass flow rate of gas passing through a flow control valve decreases since density of the gas decreases when temperature of the gas rises, while the mass flow rate of the gas passing through the flow control valve increases since the density of the gas increases when temperature of the gas falls.

Even in a case where a change occurs in the density and mass flow rate of the gas passing through the flow control valve by the temperature change of the gas as mentioned above, it is possible to control the mass flow rate of gas by feedback control so as to match a set flow rate as long as the mass flow rate of the gas measured by the flow meter is correctly corrected based on the temperature of the gas. However, when the temperature of the gas change, time which is required for the flow rate of the gas to rise up (response time) changes when the set flow rate is changed from zero to a value other than zero, for example. In this case, for example, the response time when the temperature of the gas is higher than the reference temperature becomes longer as compared with the response time when the temperature of the gas is the reference temperature. On the contrary, the response time when the temperature of the gas is lower than the reference temperature becomes shorter as compared with the response time when the temperature of the gas is the reference temperature. For this reason, since a timing, at which the gas is actually supplied to semiconductor manufacturing equipment, changes in accordance with the temperature of the gas, it may lead to a problem with quality management, etc., for example.

Embodiments of the present invention discussed below have been made in view of the above-mentioned problem, and one objective of the present invention is to provide a mass flow controller which can reduce a change of response time in varying of a valve opening of a flow control valve even in a case where temperature of gas is different from a reference temperature.

Advantageous Effects of Invention

In accordance with the present invention, even in a case where the temperature of the gas is different from the reference temperature, since the valve opening of the flow control valve can be controlled to a value with consideration for change of density of the gas due to the temperature difference, change of response time due to the temperature of the gas can be reduced. Namely, in accordance with the present invention, a mass flow controller wherein change of response speed on changing a valve opening of a flow control valve due to temperature of gas is reduced can be provided.

DESCRIPTION OF EMBODIMENTS

Embodiments for implementing the present invention will be explained hereafter referring to drawings. However, the embodiments explained hereafter merely exemplify embodiments of the present invention, and embodiments of the present invention are not limited to the embodiments exemplified hereafter.

FIG. 1 is a diagram for showing an example of a configuration of a mass flow controller according to the present invention. FIG. 1 is a conceptual diagram for showing a logical relation between members constituting a mass flow controller according to the present invention, and does not express a physical spatial relation between respective members. As shown in FIG. 1, a mass flow controller 1 according to the present invention comprises a flow control valve 2, a flow meter 3, and a control means 4. Gas flows from the left-hand side toward right-hand side in FIG. 1 through a path 7 prepared in the mass flow controller 1 (refer to an outlined white arrow shown in FIG. 1).

The flow control valve 2 is configured such that its valve opening can be changed (increased and decreased) by a valve 2b driven by a valve opening-and-closing means 2a. The valve 2b is disposed in the path 7 of the gas, and a flow rate of the gas flowing through the path 7 is controlled depending on the valve opening of the valve 2b, as mentioned above.

Although the valve 2b may have any structures as long as the flow rate of the gas can be controlled by opening and closing of the valve, a diaphragm valve is used generally in a mass flow controller. In case of a diaphragm valve, gas flows to a downstream side from an upstream side through a gap between a diaphragm and a valve seat. A value corresponding to a cross-sectional area of the gap between the diaphragm and the valve seat (for example, a ratio of a cross-sectional area to a maximum cross-sectional area, etc.) comes to be the valve opening. The valve opening-and-closing means 2a is a means to drive the valve 2b to change (increase and decrease) the valve opening and, specifically, a piezoelectric element and a solenoid coil, etc. can be mentioned, for example.

The flow meter 3 is configured to measure a mass flow rate of the gas passing through the flow control valve 2. The flow meter 3 is disposed in the path 7. In FIG. 1, although the flow meter 3 is disposed on an upstream side of the flow control valve 2, the flow meter 3 may be disposed at any position in the path 7 as long as a mass flow rate of the gas flowing through the path can be measured. As the flow meter 3, a mass flow meter which has a well-known structure, such as a thermal type flow meter and a pressure type flow meter, for example, can be used.

The control means 4 is configured to control the valve opening by changing intensity of a control signal 6 output to the flow control valve 2 such that the mass flow rate of the gas measured by the flow meter 3 matches a set flow rate. Here, the "set flow rate" is a target value of the flow rate of the gas passing through the flow control valve 2, and a user of the mass flow controller 1 can input the "set flow rate" with an input means, which is not shown, into the control means 4. The control means 4 receives the mass flow rate of the gas measured by the flow meter 3 as an input signal (refer to a long dashed short dashed line arrow shown in FIG. 1). The control means 4 outputs the control signal 6 to the flow control valve 2 such that the mass flow rate of the gas received from the flow meter 3 as an input signal matches the set flow rate (refer to a solid line arrow shown in FIG. 1).

For example, the control means 4 outputs the control signal 6 for increasing the valve opening when the mass flow rate of the gas is less than the set flow rate, and outputs the control signal 6 for decreasing the valve opening when the mass flow rate of the gas is more than the set flow rate. For example, when a piezoelectric element is used as the valve opening-and-closing means 2a, the control signal 6 is specifically a voltage signal, and when a solenoid coil is used as the valve opening-and-closing means 2a, the control signal 6 is specifically an electric-current signal.

The control means 4 can be constituted by well-known hardware and software. For example, the control means 4 may be constituted by a central processing unit (CPU) and a memory, etc. on a control circuit board disposed inside of the mass flow controller 1, and may be constituted by an external computer electrically connected with the mass flow controller 1.

A well-known control technology can be used to adjust the control signal 6 such that the flow rate of the gas matches the set flow rate as a target value. As a specific example of such a well-known control technology, feedback control in which the output the control signal 6 is corrected based on the difference between the measured flow rate of the gas and the set flow rate (including a PID action) and what is called feedforward control in which the control signal 6 is output only based on the set flow rate without being based on the flow rate of the gas measured by the flow meter 3, etc. can be mentioned, for example.

The mass flow controller 1 according to the present invention further comprises a thermometer 5. The thermometer 5 is configured to measure temperature of the gas. Although the thermometer 5 may have any configuration as long as the temperature of the gas can be measured, it is preferable to be a configuration which can detect without delay change of the temperature of the gas flowing through the path 7. The thermometer 5 may be disposed in any position in the path 7. However, when there is a non-negligible difference between temperatures of gas at locations in the path 7 of the mass flow controller 1, it is desirable to dispose the thermometer 5 in a position as close as possible to the valve 2b in the light of the objective of the present invention.

In the present invention, the control means 4 is characterized by outputting the control signal 6 adjusted such that a deviation of the flow rate of the gas passing through the flow control valve 2 due to the difference between density of the gas at measured temperature and density of the gas at reference temperature is eliminated, when the measured temperature of the gas is different from the reference temperature. Here, the "measured temperature" means temperature of the gas measured by the thermometer 5. The thermometer 5 outputs the measured temperature as an output signal to the control means 4 (refer to a broken line arrow shown in FIG. 1).

Specifically, the control means 4 receives the measured temperature output from the thermometer 5 as an input signal, and compares the measured temperature with the reference temperature. Here, the "reference temperature" means temperature of the gas when calibration of the flow meter 3 was performed using reference gas (for example, nitrogen gas). For example, the reference temperature is 22° C. When the measured temperature is different from the reference temperature as a result of this comparison, the control means 4 adjusts the intensity of the control signal 6.

Adjustment of the intensity of the control signal 6 by the control means 4 is performed such that the deviation of the flow rate of the gas passing through the flow control valve 2 resulting from the difference between the density of the gas at the measured temperature and the density of the gas at the reference temperature and may be eliminated. As mentioned above, even when pressure of gas passing through a flow control valve and a valve opening are constant, density of the gas changes depending on temperature. For this reason, in a case where the measured temperature of the gas is different from the reference temperature, a mass flow rate of the gas passing through the flow control valve per unit time comes to be a value different from a mass flow rate when temperature of the gas is the reference temperature, even when the valve opening is constant.

Therefore, the control means 4 adjusts the intensity of the control signal 6 such that change of the mass flow rate resulting from the difference in the density of the gas due to the difference in temperature is cancelled (negated). For example, since the density of the gas becomes lower than the density at the reference temperature when the measured temperature is higher than the reference temperature, the control means 4 outputs the control signal 6 with the intensity adjusted such that the valve opening becomes larger than the valve opening at the reference temperature. On the contrary, since the density of the gas becomes higher than the density at the reference temperature when the measured temperature is lower than the reference temperature, the control means 4 outputs the control signal 6 with the intensity adjusted such that the valve opening becomes smaller than the valve opening at the reference temperature.

More particularly, the control means 4 is configured to perform signal correction processing in the above-mentioned flow rate control when the measured temperature is different from the reference temperature. The "signal correction processing" means processing in which the intensity of the control signal 6 is adjusted such that an absolute value of a change amount of the valve opening becomes larger as the measured temperature becomes further higher than the reference temperature, the absolute value of the change amount of the valve opening becomes smaller as the measured temperature becomes further lower than the reference temperature, and the control signal 6 adjusted in this way is output as the corrected control signal.

Thus, in accordance with the mass flow controller according to the present invention, since the control signal 6 adjusted depending on the measured temperature of the gas (corrected control signal) is output to the flow control valve 2, change of the response time can be reduced effectively even when the temperature of the gas is different from the reference temperature. Therefore, even when the temperature of the gas or the mass flow controller changes due to an external factor, change of supply timing (response time) of the gas to semiconductor manufacturing equipment, etc. can be reduced effectively.

In the present invention, the adjustment of the intensity of the control signal 6 is performed based on the difference in the density of the gas due to the difference between the measured temperature of the gas measured with the thermometer 5 and the reference temperature regardless of a value the flow rate of the gas measured by the flow meter 3. Therefore, effectiveness of the present invention can be obtained (attained) not only when control which the control means 4 performs is feedback control, but the same effectiveness can be obtained also when the control is feedforward control.

In a preferable embodiment of the present invention, the flow control valve 2 is configured such that the valve opening becomes larger as the intensity of the control signal 6 becomes larger. In this case, the control means 4 is configured to set, as a value of the intensity of the corrected control signal, a value acquired by adding a value acquired by multiplying a value of the temperature difference by a temperature correction coefficient, to a value of intensity of an unadjusted control signal 6 (control signal 6 before the adjustment), in the above-mentioned signal correction processing. Alternatively, the flow control valve 2 is configured such that the valve opening becomes larger as the intensity of the control signal 6 becomes smaller. In this case, the control means 4 is configured to set, as a value of the intensity of the corrected control signal, a value acquired by subtracting a value acquired by multiplying a value of the temperature difference by the temperature correction coefficient, from a value of intensity of an unadjusted control signal 6 (control signal 6 before the adjustment), in the above-mentioned signal correction processing.

Here, the "temperature correction coefficient" means a fixed coefficient set so as to cancel (negate) the change of the mass flow rate resulting from the difference in the density of the gas due to the difference in the measured temperature of the gas. By adjusting the intensity of the control signal 6 in this way, calculation becomes easier, and it is effective especially when the density of the gas can be approximated with a primary function of temperature.

The temperature correction coefficient can be acquired theoretically. For example, since a coefficient of cubic expansion of ideal gas under a constant pressure is $1/273$ per ° C.=0.37%, this value can be used as the temperature correction coefficient. Moreover, the temperature correction coefficient can also be acquired experimentally. For example, difference in actually measured values of the control signal 6 between when the flow rate of the gas at the reference temperature is stable and when the flow rate of the gas at the measured temperature different from the reference temperature is stable is experimentally acquired for each of different levels of set flow rates, and an average value of the values of the difference can be used as the temperature correction coefficient.

In accordance with the inventor's investigation, the minimum value of the temperature correction coefficient experimentally acquired in Working Example 1 which will be mentioned later is 0.30%/° C., the maximum value thereof is 0.90%/° C., and the average value thereof is 0.61%/° C. However, specific numerical value of the temperature correction coefficient may change depending on a design and specification of the mass flow controller. Therefore, when implementing a more preferable embodiment of the present invention, it is preferable to conduct an experiment for specifying the temperature correction coefficient in the mass flow controller itself to be used or a mass flow controller having the same design and specification as those of the mass flow controller to be used.

In another preferable embodiment of the present invention, the control means 4 is configured to perform the above-mentioned flow rate control by what is called feedback control. Here, the "feedback control" means control in which a flow rate difference which is a difference acquired by subtracting the measured flow rate from the set flow rate is brought close to zero by changing the intensity of the control signal 6 when the absolute value of the flow rate difference is a predetermined threshold or more.

In accordance with the above, the mass flow rate of the gas can be certainly brought close to the set flow rate by feedback control while effectively reducing the change of the response time, even when the measured temperature of the gas is different from the reference temperature.

In the above-mentioned embodiment, the intensity of the control signal 6 in the above-mentioned flow rate control may be configured as a sum of an initial value determined based on the set flow rate and the measured temperature and a compensation value determined based on the flow rate difference (difference acquired by subtracting the measured flow rate from the set flow rate). In this case, the control means 4 may be configured to perform the signal correction processing only on the initial value and not to perform the signal correction processing on the compensation value.

Specifically, for example, when the flow rate control which the control means 4 performs is what is called PID control and the control signal 6 is configured as the sum of the initial value and a PID compensation value, the adjustment of the intensity of the control signal 6 based on the measured temperature (signal correction processing) is performed only on the initial value and is not performed on the PID compensation value. Here, the "initial value" of the control signal 6 means a constant determined based on the set flow rate and the measured temperature, which is a control signal first output to the flow control valve 2 after the set flow rate is changed (from zero to a value other than zero, for example). Moreover, the "PID compensation value" means a control signal for performing the PID control performed based on the difference between the measured flow rate and the set flow rate of the gas after the initial value is output to the flow control valve 2.

While the feedback control (PID control) as the above is being performed, the control signal 6 configured as the sum of the initial value and the PID compensation value is output to the flow control valve 2. Since the effectiveness of the present invention can be acquired sufficiently even when the adjustment of the intensity of the control signal 6 based on the measured temperature (signal correction processing), which is a feature of the present invention, is performed only on the initial value, a control action by the control means 4 can be performed stably, while reducing the calculation load (operation load) in the control means 4, by omitting the signal correction processing on the PID compensation value to simplify the whole control action.

Working Example 1

Three kinds of mass flow controllers according to the present invention, which comprise a normally closed type flow control valve comprising a piezoelectric element and a diaphragm valve, a thermal type mass flow meter, a control circuit board constituting a control means and a thermometer, with maximum flow rates set to three levels of 0.1, 5 and 50 slm were prepared. Using these mass flow controllers, the control signals (voltage) output to the piezoelectric element when primary pressure of nitrogen gas is set to four levels of 150, 250, 350 and 450 kPa and the set flow rates are set to seven levels of 2, 5, 10, 25, 50, 75 and 100% of the maximum flow rates are measured respectively for two levels of temperature of nitrogen gas of 25° C., and 60° C.

Under any condition, a value of the control signal (voltage) output to the piezoelectric element at 60° C. was higher as compared with that when the temperature of nitrogen gas was 25° C. Namely, at an identical mass flow rate, the valve opening when the temperature of nitrogen gas was 60° C. was larger than the valve opening when the temperature of nitrogen gas was 25° C. Although the amount of alteration per 1° C. of the control signal (voltage) had some variations depending on the set flow rate and/or the primary pressure of nitrogen gas, an average value thereof was 0.61%/° C. Therefore, based on the result of this preliminary experiment, it is decided to set a value of the temperature correction coefficient for these three kinds of mass flow controllers (with the maximum flow rates of 0.1, 5 and 50 slm) to 0.60%/° C.

Next, using the mass flow controller with the maximum flow rates of 5 slm, the time changes of the flow rate of nitrogen gas (response waveforms) shown by the flow meter when the primary pressure of nitrogen gas was set to 150 kPa and the set flow rates were set to two levels of 100% and 50% of the maximum flow rate were measured for two levels of the temperature of nitrogen gas of 25° C. and 60° C., respectively. A response waveform when the set flow rate was 100% is shown in FIG. 2.

Figure 2:
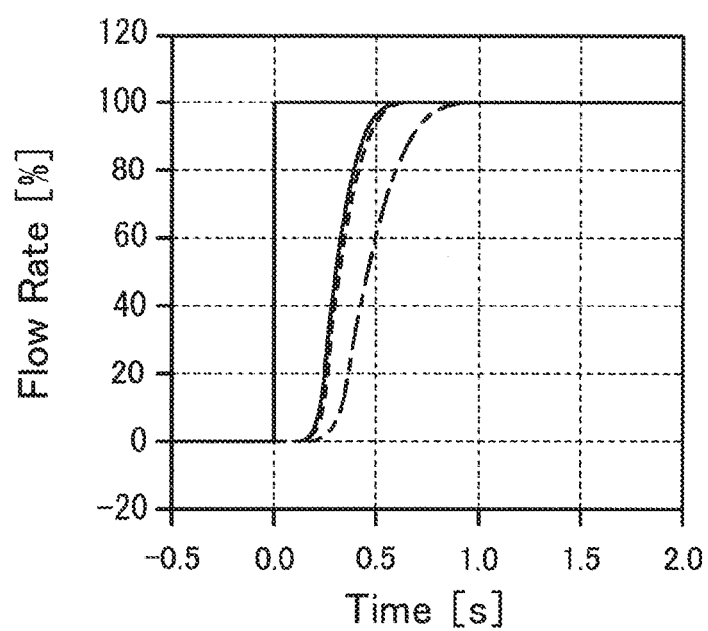
FIG. 2 is a graph for showing an example of a response waveform of a mass flow controller in Working Example 1.

The horizontal axis of FIG. 2 shows time [s] from a starting point (zero) when 100% of the set flow rate is input into the control means 4. Moreover, the vertical axis shows the set flow rate [%] and the measured flow rate [%] of nitrogen gas measured by the flow meter. A graph expressed by a solid line rectangle shows change of a value of the set flow rate. The set flow rate changes from 0 to 100% when time is zero, and it is being maintained at 100% thereafter.

A solid line curve closest to the set flow rate shows a response curve when the temperature of nitrogen gas is 25° C. in the mass flow controller according to a Working Example of the present invention. On the other hand, a broken line curve shows a response curve when the temperature of nitrogen gas is 60° C. in the mass flow controller according to the Working Example of the present invention. Since these two response curves are mostly overlapped, it is found that change is hardly observed in response time even when the temperature of gas rises from 25° C. to 60° C. in the mass flow controller according to the present invention.

On the other hand, a long dashed short dashed line curve furthest from the set flow rate in FIG. 2 shows a response curve when the temperature of nitrogen gas is 60° C., which was measured using a mass flow controller according to a Comparative Example. This mass flow controller has the same specification as that of the mass flow controller with the maximum flow rates of 5 slm, according to the Working Example of the present invention, but does not perform the adjustment of the intensity of the control signal depending on the difference between the temperatures of the gas (signal correction processing). It is found that response time corresponding to the response curve for this Comparative Example is longer as compared with those corresponding to other response curves.

Next, response time was acquired from a response curve for each of various levels measured by the above-mentioned method. Here, the "response time" means a time period since the set flow rate was changed until the measured flow rate reaches 98% of the set flow rate. For each of the set flow rates of 100% and 50%, the response time when the temperature of nitrogen gas is 25° C., the response time when the temperature of nitrogen gas is 60° C. and difference between both are respectively shown in Table 1. Moreover, as Comparative Examples, the response time measured using a mass flow controller which does not adjust the intensity of the control signal based on the difference in the temperature of gas (signal correction processing) are also shown in Table 1.

TABLE 1

|  | Set Flow Rate [%] | Response Time [s] 25° C. | 60° C. | Difference [s] |
|---|---|---|---|---|
| Working Example | 100 | 0.60 | 0.62 | 0.02 |
| Comparative Example | " | 0.60 | 0.95 | 0.35 |
| Working Example | 50 | 0.56 | 0.61 | 0.05 |
| Comparative Example | " | 0.56 | 1.26 | 0.70 |

As shown in Table 1, in the mass flow controller according to the Working Example of the present invention, the change amount of the response time due to the temperature change from 25° C. to 60° C. was at most 0.05 s or less, and the differences in the response time were small. On the other hand, the difference in the response time of the Comparative Example was as large as 0.35 s when the set flow rate was 100%, and the difference of the response time when the set flow rate is 50% became further larger to be 0.70 s. From these results, it is found that the change of the response time due to the difference in the temperature of gas is reduced largely as compared with the mass flow controller according to a conventional technology since the control signal is adjusted according to the temperature of gas in the mass flow controller according to the present invention.

Working Example 2

In the above-mentioned Working Example 1, it has been confirmed that the delay in the response time due to rising of the measured temperature of gas from the reference temperature is reduced largely, as compared with a mass flow controller according to a conventional technology which does not perform the signal correction processing in the flow rate control, in accordance with the mass flow controller according to the present invention which performs the signal correction processing in the flow rate control.

In this Working Example, using mass flow controllers which have the same configuration as those in Working Example 1, flow rate ranges were set to two levels of Bin6 (3001 to 10000 sccm (standard cubic centimeter per minute)) and Bin8 (10001 to 30000 sccm). Namely, in this Working Example, the maximum flow rates were set to two levels of 10000 sccm and 30000 sccm. Moreover, the set flow rates were respectively set to three levels of 10%, 50% and 100% of each of the maximum flow rates. Furthermore, the calibration of these mass flow controllers was performed using nitrogen gas, at the primary pressure of 500 kPa and the reference temperature of 22° C.

In addition, as for the mass flow controller with the flow-rate range set to Bin6 (maximum flow rate=10000 sccm), the primary pressure of nitrogen gas was set to two levels of 300 kPa and 500 kPa. On the other hand, as for the mass flow controller with the flow rate range set to Bin8 (maximum flow rate=30000 sccm), the primary pressure of nitrogen gas was set to two levels of 350 kPa and 500 kPa. In addition, as for both of the mass flow controllers, the measured temperature of nitrogen gas was 50° C.

Figure 3:
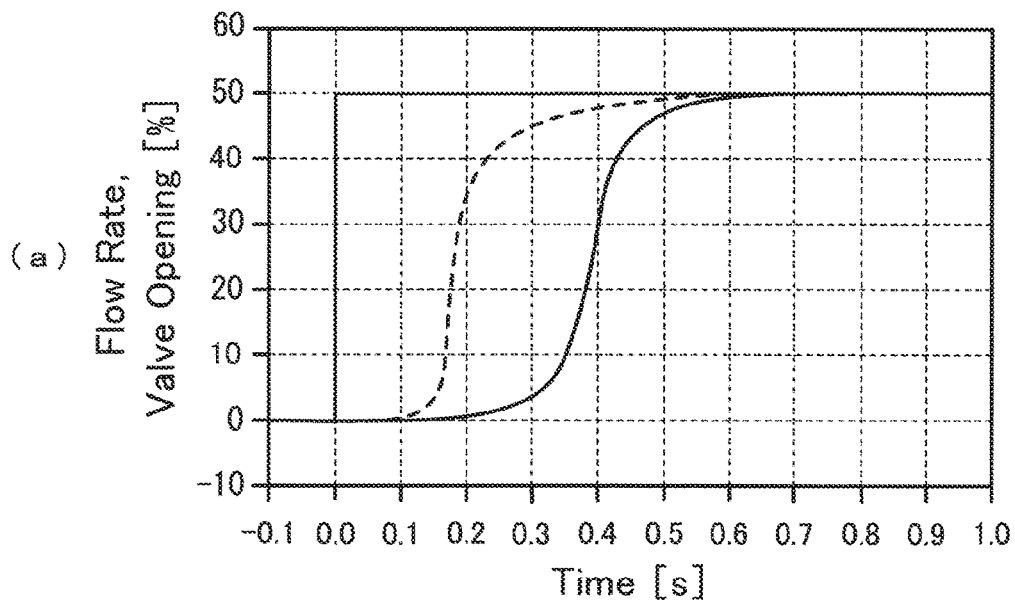
FIG. 3 is a graph for showing an example of a response waveform of a mass flow controller in Working Example 2.
Figure 3:
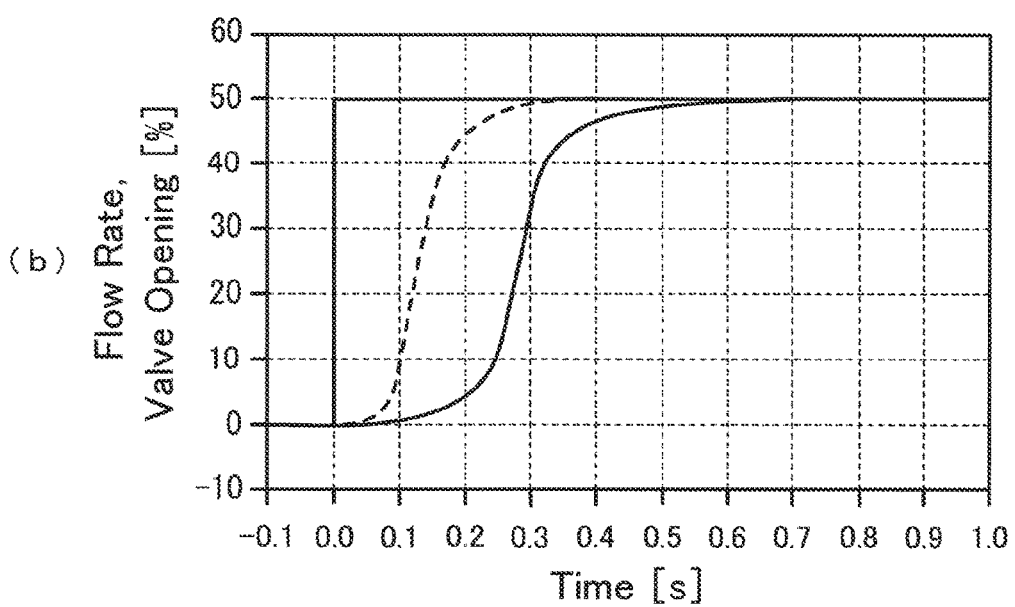

For each of the above-mentioned twelve levels (combinations of two levels of the maximum flow rates, three levels of the set flow rate, and two levels of the primary pressure) of the mass flow controllers, two levels of a case where the signal correction processing in the flow rate control was performed (Working Example of the present invention) and a case where the signal correction processing was not performed (Comparative Example) were set up, and the time changes of the flow rate of nitrogen gas (response waveforms) shown by the flow meter were measured respectively. As an example, a response waveform when the flow rate range is Bin8, the set flow rate is 50% and the primary pressure of nitrogen gas is 350 kPa is shown in FIG. 3. (a) of FIG. 3 is a response waveform in the mass flow controller according to the Comparative Example, which does not perform the signal correction processing, and (b) of FIG. 3 is a response waveform in the mass flow controller according to the Working Example of the present invention, which performs the signal correction processing.

The horizontal axis of FIG. 3 shows time [s] from a starting point (zero) when 50% of the set flow rate is input into the control means 4. Moreover, the vertical axis shows the set flow rate [%], the measured flow rate [%] of nitrogen gas measured by the flow meter, and the valve opening [%] of the flow control valve. A graph expressed by a solid line rectangle shows change of a value of the set flow rate. In both (a) and (b) of FIG. 3, the set flow rate changes from 0 to 50% when time is zero, and it is being maintained at 50% thereafter.

A graph with expressed by a broken line curve shows the valve opening [%] of the flow control valve, and a graph expressed by a solid line curve shows the measured flow rate [%] of nitrogen gas. It is found that rise up of the valve opening of the flow control valve and the measured flow rate of nitrogen gas with respect to the change of the set flow rate is quicker in a case where the signal correction processing is performed in the flow rate control (Working Example shown in (b) of FIG. 3), as compared with that in a case where the signal correction processing is not performed (Comparative Example shown in (a) of FIG. 3). Namely, it is found that the delay in the response time of the valve opening of the flow control valve and the measured flow rate of nitrogen gas with respect to the change of the set flow rate was reduced by performing the signal correction processing in the flow rate control.

Next, the result of acquisition of the response time from the response curve for each of various levels measured by the above-mentioned method is shown in Table 2. Here, the "response time" also means a time period since the set flow rate was changed until the measured flow rate reaches 98% of the set flow rate.

TABLE 2

| Flow Rate Range (Max. Flow Rate) | Primary Pressure [kPa] | Set Flow Rate [%] | Response Time [s] Signal Not Corrected | Signal Corrected |
|---|---|---|---|---|
| Bin6 (10000 sccm) | 300 | 10 | 0.66 | 0.23 |
|  |  | 50 | 0.58 | 0.30 |
|  |  | 100 | 0.55 | 0.35 |
|  | 500 | 10 | 0.92 | 0.58 |
|  |  | 50 | 0.77 | 0.56 |
|  |  | 100 | 0.79 | 0.64 |
| Bin8 (30000 sccm) | 350 | 10 | 0.70 | 0.49 |
|  |  | 50 | 0.58 | 0.50 |
|  |  | 100 | 0.65 | 0.57 |
|  | 500 | 10 | 0.73 | 0.54 |
|  |  | 50 | 0.61 | 0.52 |
|  |  | 100 | 0.61 | 0.54 |

As shown in Table 2, it is also found that the response time in the mass flow controller according to the Working Example of the present invention, which performs the signal correction processing in the flow rate control (Signal Corrected), is shorter as compared with the response time in the mass flow controller according to the Comparative Example, which does not performs the signal correction processing in the flow rate control (Signal Not Corrected), at any of the flow rate rage (maximum flow rate), the set flow rate and the primary pressure. Namely, it is found that the delay (increase) in the response time due to a state where the measured temperature (50° C.) is higher than the reference temperature (22° C.) was reduced.

The invention claimed is:
1. A mass flow controller comprising:
a flow control valve configured such that a valve opening of said flow control valve can be changed;
a flow meter configured to measure a flow rate of gas passing through said flow control valve;
a thermometer configured to measure a temperature of said gas; and
a control means configured to output a control signal to said flow control valve to control said valve opening;
said control means is configured to:
obtain an absolute value of a temperature difference, said temperature difference is a difference acquired by subtracting a predetermined reference temperature from a measured temperature, wherein the measured temperature is a temperature of said gas measured by said thermometer;
perform flow rate control in which said control means outputs said control signal to said flow control valve to control said valve opening such that a measured flow rate which is a mass flow rate of said gas measured by said flow meter matches a set flow rate as a target value of a mass flow rate of said gas;
perform signal correction processing in which said control means outputs a corrected control signal to control said valve opening;
adjust said corrected control signal such that an absolute value of a change amount of said valve opening in said flow rate control becomes larger as an absolute value of said temperature difference becomes larger when said measured temperature is higher than a reference temperature; and
adjust said corrected control signal such that the absolute value of the change amount of said valve opening in said flow rate control becomes smaller as the absolute value of said temperature difference becomes larger when said measured temperature is lower than said reference temperature.
2. The mass flow controller according to claim 1, wherein:
said flow control valve is configured such that said valve opening becomes larger as intensity of said control signal becomes larger, and
said control means is configured to set, as a value of the intensity of said corrected control signal, a value acquired by adding a value acquired by multiplying a value of said temperature difference by a temperature correction coefficient, to a value of intensity of an unadjusted control signal, in said signal correction processing.
3. The mass flow controller according to claim 1, wherein:
said flow control valve is configured such that said valve opening becomes larger as intensity of said control signal becomes smaller, and
said control means is configured to set, as a value of the intensity of said corrected control signal, a value acquired by subtracting a value acquired by multiplying a value of said temperature difference by a temperature correction coefficient, from a value of intensity of an unadjusted control signal, in said signal correction processing.

4. The mass flow controller according to claim 1, wherein:
said control means is configured to perform said flow rate control by feedback control in which a flow rate difference which is a difference acquired by subtracting said measured flow rate from said set flow rate is brought close to zero by changing intensity of said control signal when the absolute value of said flow rate difference is a predetermined threshold or more.
5. The mass flow controller according to claim 1, wherein:
said control means is configured to perform said flow rate control by feedback control in which a flow rate difference which is a difference acquired by subtracting said measured flow rate from said set flow rate is brought close to zero by changing intensity of said control signal when the absolute value of said flow rate difference is a predetermined threshold or more; and
the intensity of said control signal in said flow rate control is configured as a sum of an initial value determined based on said set flow rate and said measured temperature and a compensation value determined based on said flow rate difference, and
said control means is configured to perform said signal correction processing only on said initial value and not to perform said signal correction processing on said compensation value.
6. The mass flow controller according to claim 1, wherein:
said flow control valve is configured such that said valve opening becomes larger as intensity of said control signal becomes larger, and
said control means is configured to set, as a value of the intensity of said corrected control signal, a value acquired by adding a value acquired by multiplying a value of said temperature difference by a temperature correction coefficient, to a value of intensity of an unadjusted control signal, in said signal correction processing, wherein:
said control means is configured to perform said flow rate control by feedback control in which a flow rate difference which is a difference acquired by subtracting said measured flow rate from said set flow rate is brought close to zero by changing intensity of said control signal when the absolute value of said flow rate difference is a predetermined threshold or more.
7. The mass flow controller according to claim 6, wherein:
the intensity of said control signal in said flow rate control is configured as a sum of an initial value determined based on said set flow rate and said measured temperature and a compensation value determined based on said flow rate difference, and
said control means is configured to perform said signal correction processing only on said initial value and not to perform said signal correction processing on said compensation value.
8. The mass flow controller according to claim 1, wherein:
said flow control valve is configured such that said valve opening becomes larger as intensity of said control signal becomes smaller, and
said control means is configured to set, as a value of the intensity of said corrected control signal, a value acquired by subtracting a value acquired by multiplying a value of said temperature difference by a temperature correction coefficient, from a value of intensity of an unadjusted control signal, in said signal correction processing; wherein:
said control means is configured to perform said flow rate control by feedback control in which a flow rate difference which is a difference acquired by subtracting said measured flow rate from said set flow rate is brought close to zero by changing intensity of said control signal when the absolute value of said flow rate difference is a predetermined threshold or more.

9. The mass flow controller according to claim 1, wherein:
said flow control valve is configured such that said valve opening becomes larger as intensity of said control signal becomes smaller, and
said control means is configured to set, as a value of the intensity of said corrected control signal, a value acquired by subtracting a value acquired by multiplying a value of said temperature difference by a temperature correction coefficient, from a value of intensity of an unadjusted control signal, in said signal correction processing; wherein:
said control means is configured to perform said flow rate control by feedback control in which a flow rate difference which is a difference acquired by subtracting said measured flow rate from said set flow rate is brought close to zero by changing intensity of said control signal when the absolute value of said flow rate difference is a predetermined threshold or more;
the intensity of said control signal in said flow rate control is configured as a sum of an initial value determined based on said set flow rate and said measured temperature and a compensation value determined based on said flow rate difference, and
said control means is configured to perform said signal correction processing only on said initial value and not to perform said signal correction processing on said compensation value.

* * * * *